United States Patent

[11] 3,536,102

[72] Inventors Murry Allewitz and
 Abduz Zahid, Los Angeles, California
[21] Appl. No. 720,138
[22] Filed April 10, 1968
[45] Patented Oct. 27, 1970
[73] Assignee Greer Hydraulics, Inc.
 Los Angeles, California
 a corporation of New York

[54] FLOW THROUGH PRESSURE ACCUMULATOR
 3 Claims, 6 Drawing Figs.
[52] U.S. Cl. .................................................. 138/30
[51] Int. Cl. .................................................. F16l 55/12
[50] Field of Search .......................................... 138/26, 30,
 113, 114; 210/441, 442, 435, 446

[56] References Cited
UNITED STATES PATENTS
2,861,595 11/1958 Pier .............................. 138/30
2,875,788 3/1959 Pier .............................. 138/30

Primary Examiner—Laverne D. Geiger
Assistant Examiner—R. J. Sher
Attorney—Arthur B. Colvin ABSTRACT: This invention relates to the art of pressure accumulators and more particularly to a pressure accumulator of the flow through type which may be inserted directly into a line through which fluid under pressure is flowing to compensate for pressure surges or pulses in such line.

Patented Oct. 27, 1970
3,536,102
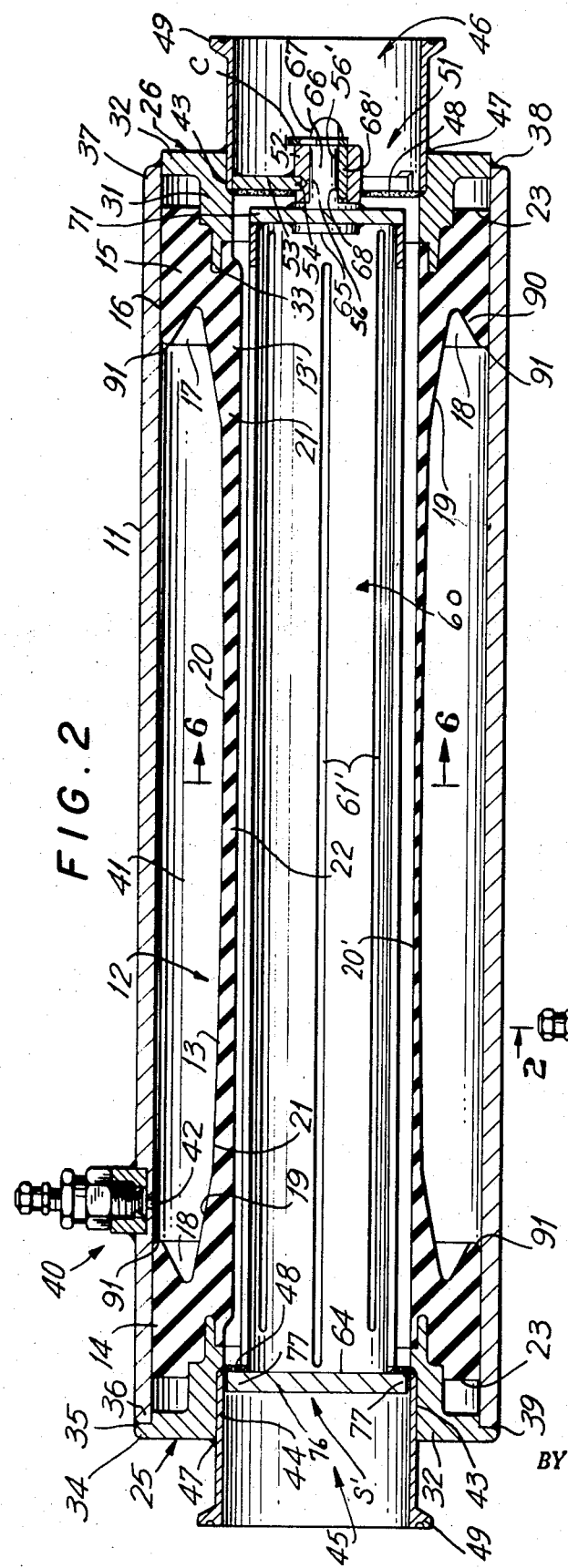
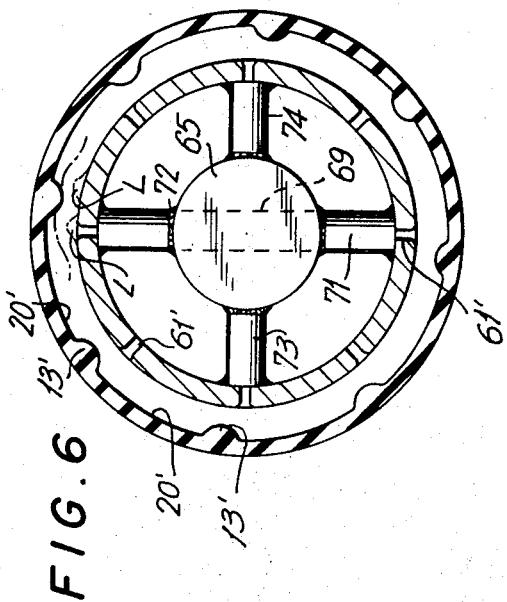
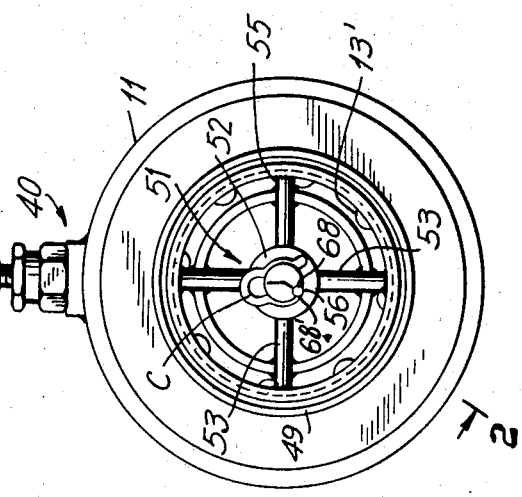
INVENTORS
MURRY ALLEWITZ
ABDUZ ZAHID
BY
ATTORNEY

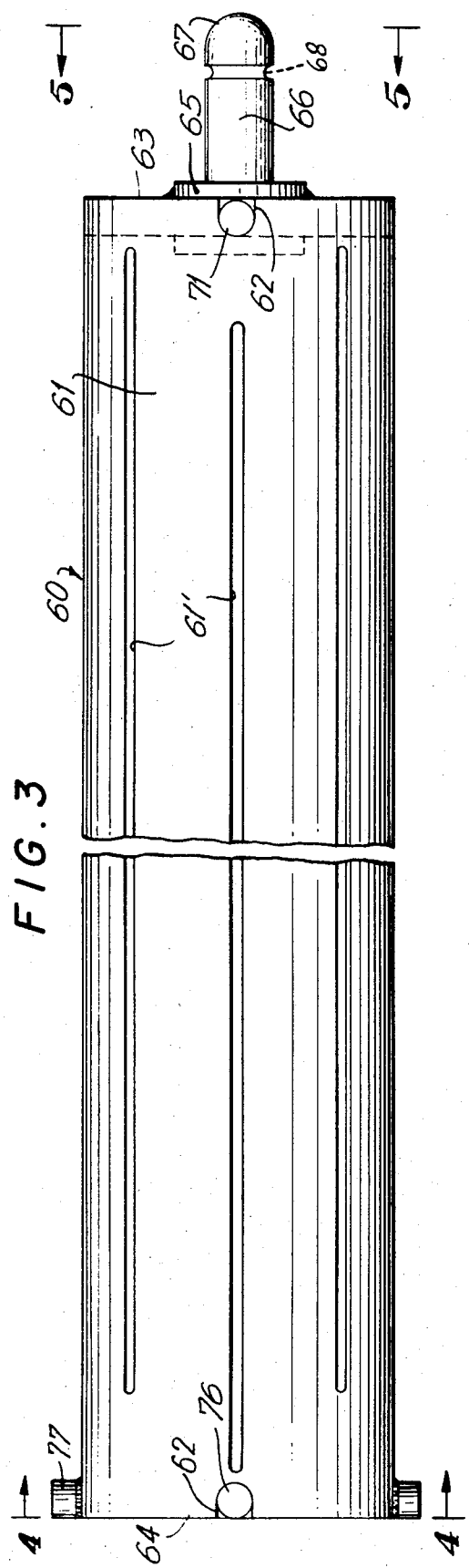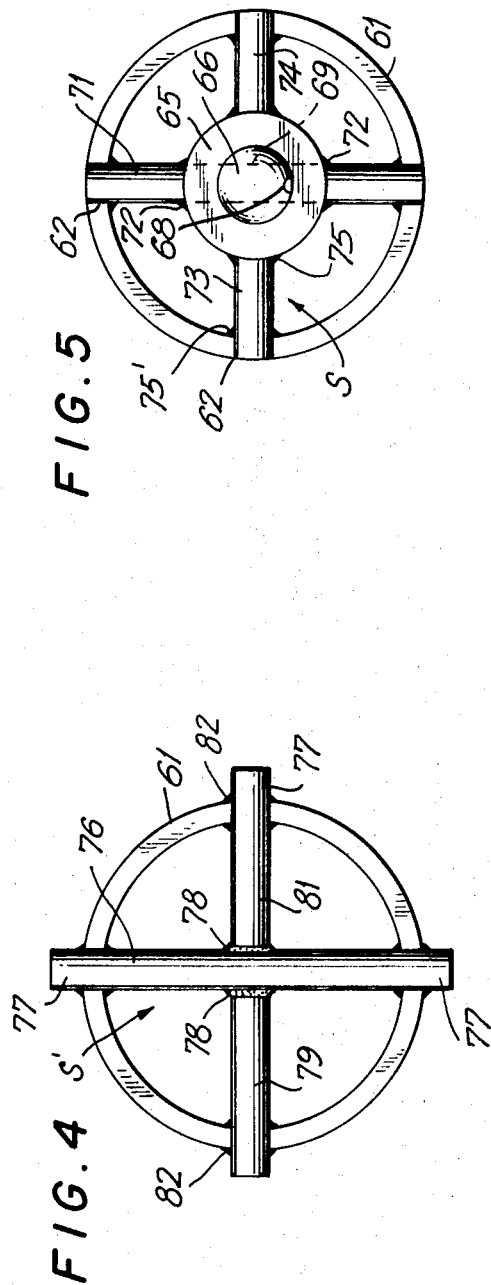

FLOW THROUGH PRESSURE ACCUMULATOR

As conducive to an understanding of the invention, it is to be noted that where a system is provided through which a liquid food product such as milk is flowing, and such milk is being forced under pressure into a homogenizer, for example, the action of the homogenizer causes pulses of relatively great amplitude to be developed in the system with resultant pressure surges which could cause cracking of the pipes or conduits utilized in the system with resultant breakdown of the system and loss of the milk.

It is essential in systems in which a liquid food product such as milk is being handled, that all parts of the system which may be contacted by the milk, be readily accessible for cleaning to prevent contamination of the milk.

Accordingly, where a pressure accumulator is used in the system to dampen the pulses and the entire portion of such accumulator which is contacted by the milk is not readily available for cleaning, such accumulator is not satisfactory for its intended use to relieve pressure surges in the line.

It is accordingly among the objects of the invention to provide a flow through accumulator which is relatively simple in construction and may readily be fabricated and is not likely to become deranged even after long use and which may readily be connected into a line through which milk under pressure is flowing to a homogenizer, for example, and which will dependably dampen pressure surges in the system without likelihood of damage to the deformable partition utilized in the accumulator and which accumulator may be readily cleaned while still connected in the system by merely flowing a cleaning solution therethrough, and for more thorough cleaning may readily be removed from the system and disassembled to permit all components thereof which are exposed to contact with the milk flowing therethrough, to be reliably cleaned and which also may readily be assembled and reconnected into the system.

According to the invention these objects are accomplished by the arrangement and combination of elements hereinafter described and more particularly recited in the claims.

In the accompanying drawings in which is shown one of various possible embodiments of the several features of the invention:

FIG. 1 is an end view of the flow through accumulator;

FIG. 2 is a longitudinal sectional view taken along line 2-2 of FIG. 1;

FIG. 3 is a side elevational view of the mandrel or core assembly of the accumulator;

FIG. 4 is an end view taken along line 4-4 of FIG. 3;

FIG. 5 is an end view taken along line 5-5 of FIG. 3; and

FIG. 6 is a sectional view taken along line 6-6 of FIG. 2.

Referring now to the drawings, the flow through accumulator comprises an elongated cylindrical casing 11 of strong rigid material such as stainless steel or the like capable of withstanding the pressures to which the unit will be subjected in use.

Positioned in the casing and extending the length thereof is a diaphragm assembly 12. As shown in FIG. 2, the diaphragm assembly comprises a substantially cylindrical tube 13 of resilient material such as rubber or synthetic plastic of like physical characteristics capable of readily collapsing and expanding in use. The tube 13 has outwardly extending annular rims 14, 15 at each end formed integral therewith with the outer periphery of each rim presenting a flat surface 16.

The inner side 17 of each rim 14, 15 has a substantially V-shaped annular groove 18 therein, the inner beveled wall surface 19 of which extends beyond such inner side 17 and is integral with the wall portion 20 of the tube.

As is clearly shown in FIG. 2, the thickness of the wall portion 20 of the tube gradually decreases from the ends 21 of the inner beveled wall surface 19 toward the central portion 22 thereof.

The inner surface 20' of the tube has a plurality of ribs 13' extending the length thereof and preferably molded integral therewith. Illustratively eight equidistantly spaced ribs 13' are provided as is clearly shown in FIGS. 1 and 6, the function of which will be hereinafter described.

Secured to the outer side 23 of each of the rims 14, 15 is an end cap 25, 26.

The end caps 25, 26 are substantially identical and each comprises a sleeve 31 having an outwardly extending annular flange 32 of diameter just slightly less than the inner diameter of casing 11. Thus, the end cap 26 may be moved through the casing 11 when the accumulator is assembled.

The wall of sleeve 31 is of reduced thickness at its inner end as at 33, said reduced thickness portion 33 and adjacent wall surface of the sleeve 31 being bonded to the associated rim 14, 15 to form an integral unit.

The end cap 25 differs from end cap 26 only in that the periphery of the annular flange 32 thereof has an outwardly extending annular rim 34 of greater diameter than the inner diameter of the casing 11 to define an annular shoulder 35 adapted to abut against the end 36 of the casing 11.

Thus, to mount the diaphragm assembly 12 in the casing 11, the end cap 26 thereof is pushed through the casing 11 until the flange 32 thereof protrudes slightly beyond the end 37 thereof. The length of tube 13 is such that with the end cap 26 so positioned, the shoulder 35 of flange 32 of end cap 25 will abut against the end 36 of the casing 11. The periphery of flange 32 of end cap 26 is then welded as at 38 to the end 37 of the casing 11 and the periphery of rim 34 of end cap 25 is welded as at 39 to the end 36 of the casing.

The resilient tube 13 will extend longitudinally of the casing 11 with the outer periphery 16 of rims 14, 15, which are of diameter slightly greater than the inner diameter of the casing, pressing against the inner surface of the casing and with the outer surface of the tube 13 spaced from the inner wall surface of the casing 11 to define a gas chamber 41.

The gas chamber 41 may be charged with gas under pressure through a port 42 extending through the casing 11, a gas valve assembly 40 of conventional type being associated with said port 42. The bore of each of the sleeves 31 of each end cap 25, 26 is of slightly enlarged diameter at its outer end as at 43 to receive the inner end 44 of connector sleeves 45, 46 which are secured in the bores as by welding at 47 and 48.

Each of the connector sleeves 45, 46 has an outwardly extending annular flange 49 at its outer end to permit coupling thereto of a pipe or conduit (not shown) in conventional manner.

Positioned in the connector sleeve 46 at its inner end is a support member 51, which comprises a hub 52 having a plurality of radiating rods or arms 53, illustratively four in number, having their inner ends secured to the hub 52 at one end as at 54 and having their outer end secured as by welding to the inner end of connector sleeve 46 as at 55. Thus, the bore 56 of the hub 52 extends axially of the casing 11, said bore having a longitudinal keyway 56' therein.

Positioned in the casing 11 and extending axially through the tube 13 is a mandrel assembly 60 which desirably comprises an elongated sleeve 61, preferably of stainless steel, having four equidistantly spaced notches 62 in each end 63 and 64 thereof and a plurality of relatively narrow parallel slots 61' extending the length thereof with the slots alternately being closer to the ends 63, 64 of the sleeve. The slots 61' are of width to permit flow of fluid therethrough but prevent extrusion of the tube 13 when the latter is pressing thereagainst.

Positioned in end 63 of the sleeve 61 is a retainer assembly which comprises a central hub member 65, illustratively circular in cross section which has a reduced diameter axial stud 66 extending outwardly therefrom, the stud 66 having a rounded outer end 67 and a longitudinal keyway 68.

The hub 65 has a transverse bore 69 therethrough through which extends a rod 71 which protrudes an equal distance from opposed sides of the hub.

The rod 71 is secured in the bore 69 as by welding as at 72. Extending radially outwardly from the hub 65 are rods 73, 74 each of which is spaced 90° from the protruding portions of rod 71 and has its inner end secured as by welding at 75 to the periphery of hub 65. Thus, the rods 71, 73, 74 define a spider S, the ends of which fit into the notches 62 in the end 63 of the sleeve 61 and are secured in position as by welding at 75' rigidly to mount the assembly in the end 63.

Similarly, a retainer assembly is mounted in the end 64 of the sleeve. This retainer assembly comprises a rod 76 of length greater than the outer diameter of sleeve 61 so that it will extend beyond the periphery of the latter as at 77. Secured to the rod 76 as by welding at 78 are the inner ends of rods 79, 81, the rods 76, 79, 81 thus forming a rigid assembly or spider S' with the ends of the rods fitting into the associated notches 62 and being secured in place as by welding at 82. The outer ends 77 of each of the rods 76, 79, 81 extend radially beyond the outer periphery of sleeve 61 and as shown in FIG. 2, the diameter of rod 76 and the aligned rods 79, 81 is just slightly less than the inner diameter of coupling sleeve 45.

To complete the assembly of the unit after the diaphragm assembly 12 is secured in the casing 11, it is merely necessary to insert the mandrel assembly 60 through the connector sleeve 45 and the bore of tube 13 and position the stud 66 in the bore 56 of hub 52. The sleeve 61 is positioned to align the keyway 68 therein with the keyway 56' in bore 56 of hub 52 and the key pin 68' is positioned in said aligned keyways.

Thus the slots 61' will be positioned so as to be circumferentially spaced from an associated rib 31'. Consequently, when the tube 13 is compressed against the sleeve 61, the tube 13 will assume the position shown in broken lines in FIG. 6 in which there will be a small longitudinal space L aligned with each of the slots 61'.

The end of stud 66 has an annular groove (FIG. 3) to receive a C-clip C, as shown in FIGS. 1 and 2, releasably to lock the mandrel assembly 12 in place. When so mounted, the spider S' will be positioned in the coupling sleeve 45 as shown in FIG. 2 and by reason of the protruding portions 77 of rods 76, 79, 81, the associated end 64 of the sleeve 61 will be retained in position with substantially no transverse movement.

In operation, the unit above described is inserted for example, in the feed line to a milk homogenizer which is fed with milk under pressure. Due to the operation of the homogenizer, pulsations are created in the feed line, which, unless dampened, could cause cracking of the feed lines; damage to the valves used in the system and the like. The flow-through accumulator of the present invention is designed to absorb such pulses to prevent the undesirable effects above noted.

Thus, in operation of the flow-through accumulator, the chamber 41 is first charged with a suitable gas under pressure through valve 40. As a result, the tube 13 will be moved against the outer periphery of the sleeve 61 with a small longitudinal space L aligned with each of the slots 61'.

Furthermore, due to the pressure in chamber 41, the outer wall 90 of the V-groove 18 will tend to be moved outwardly to provide a dependable seal at 91. As the fluid under pressure is forced through the line, it will flow through the spaces defined by the spider S for example, in connector sleeve 46 and then flow through the bore of the sleeve 61; through the spaces defined by the spider S' and then through the discharge line connected to connector sleeve 45. In addition, there will also be some slight flow of fluid through the spaces L adjacent the ribs 13' of the tube 13.

When there are pressure surges in the fluid passing through the sleeve 61, due to the plurality of elongated slots 61' in the sleeve and the longitudinal space L aligned therewith, the pressure will substantially immediately be exerted against the inner surface of the tube 13 causing the latter to expand outwardly compressing the gas in chamber 41 and hence dampening the pressure surges.

Due to the V-shaped annular groove 18 in each of the rims 14, 15, the portion of the tube wall adjacent such rim will readily move into the groove so that strain on the rim portion of the tube is minimized which will prevent tearing of the rim away from the end cap to which it is bonded.

The unit may be cleaned while connected in the system by flushing a cleaning liquid under pressure through the unit. As such fluid enters the connector coupling 46, for example, it will readily pass longitudinally through the bore of sleeve 61 and through the slots 61' therein as well as through the spaces L adjacent each of the ribs 13 and hence deflect the portions of the tube between the ribs outwardly, so that the entire inner surface of the tube will be exposed to the action of the cleaning solution for dependable cleaning thereof.

Furthermore, by reason of the construction above described, it is a relatively simple matter to remove the mandrel assembly 60 by merely removing the "C" clip C shown in FIGS. 1 and 2 and then removing the key pin 68'. Thereupon, the entire mandrel assembly can be moved outwardly through the coupling 45 and can then be properly cleaned. Since the fluid being handled only contacts the mandrel assembly and the inner surface of the deformable tube 13, it is apparent that since the mandrel assembly is removable and is devoid of any cavities or recesses which are not readily available for cleaning, and since the entire inner surface of the tube is also available for cleaning with a suitable brush, the entire unit can be used to handle food products such as milk in which bacterial growth could rapidly build up unless the equipment could be dependably cleaned.

As many changes could be made in the above equipment and many apparently widely different embodiments of this invention could be made without departing from the scope of the claims, it is intended that all matter contained in the above description, or shown in the accompanying drawings, shall be interpreted as illustrative and not in a limiting sense.

We claim:

1. A flow through accumulator comprising a rigid cylindrical casing, a pair of end caps secured respectively to the ends of said casing, each of said end caps having an axial opening therethrough, a support member extending transversely through the opening in one of said caps, said support member having passageways therethrough and having a central hub having an axial bore, an elongated diaphragm of resilient deformable material in the form of a tube extending axially through said casing and secured at its respective ends to said end caps, the outer surface of said tube defining an annular gas chamber with respect to the inner surface of said casing, means to charge said gas chamber, a rigid sleeve positioned in the bore of said tube and extending axially thereof, said sleeve having apertures in the wall surface thereof for flow of liquid therethrough, said sleeve having a retainer assembly at one end extending transversely thereacross and having passageways therethrough, said container assembly having an axial stud adapted to seat in the bore of said central hub, means releasably to retain said stud in the bore of said hub to prevent axial movement of said sleeve, said sleeve having a retainer assembly at its other end extending transversely thereacross and having passageways therethrough, said last named retainer assembly being positioned in the opening in the other end cap and having means substantially to prevent transverse displacement of the associated end of the sleeve whereby the sleeve is releasably mounted in said casing with the bore of said sleeve aligned with the openings in said end cap, for flow of liquid therethrough.

2. The combination set forth in claim 1 in which means are provided to prevent rotary movement of said stud in said hub.

3. The combination set forth in claim 2 in which said stud and said hub have complementary key and keyway conformations to prevent rotary movement of said stud in said hub.